F. X. PFLUGER.
ROLLER HEAD.
APPLICATION FILED AUG. 6, 1914.
1,142,202.
Patented June 8, 1915.
2 SHEETS—SHEET 1.
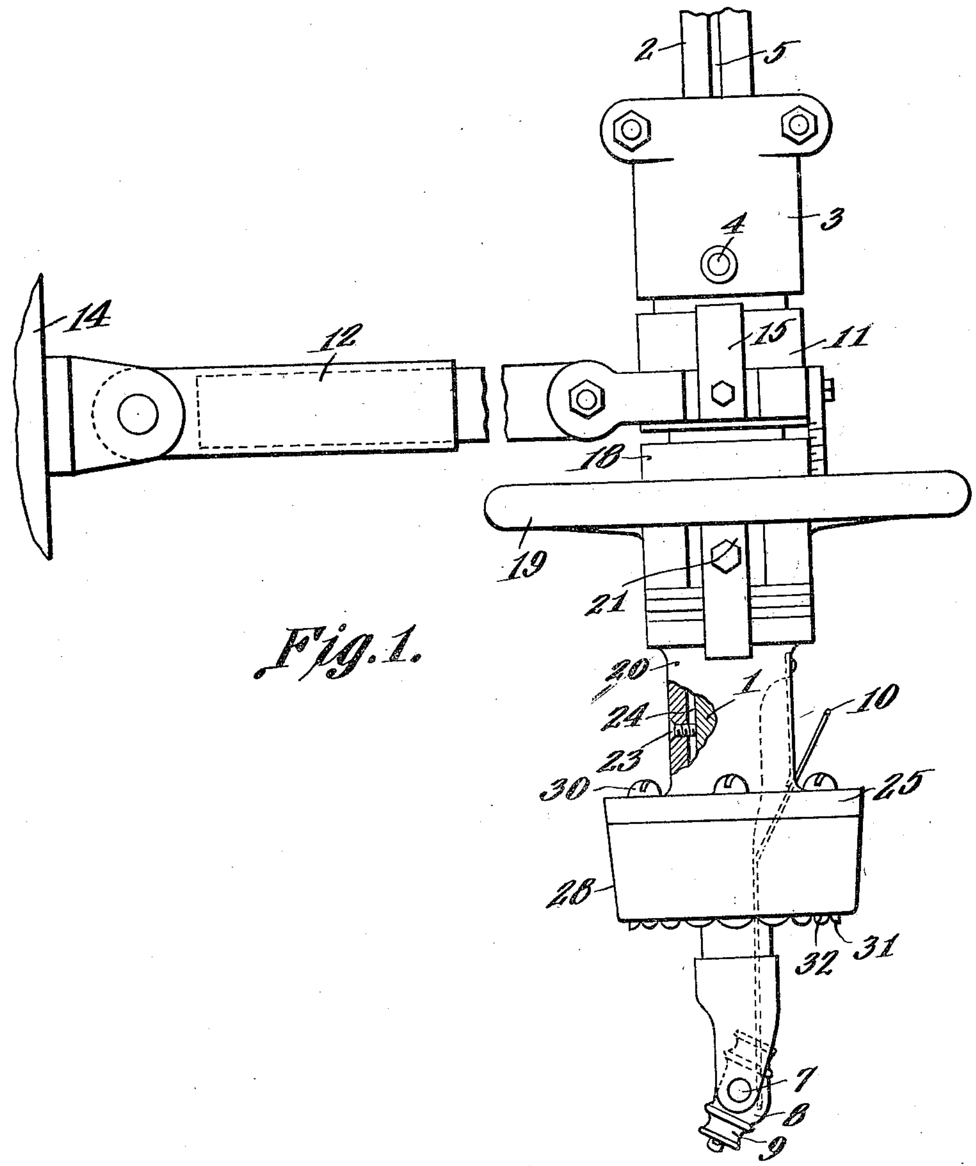
Witnesses
J. R. Towler
M. E. McCarthy
Frank X. Pfluger,
Inventor
by C.A.Snow & Co
Attorney
THE NORRIS PETERS CO., PHOTO-LITHO., WASHINGTON, D. C.

F. X. PFLUGER.
ROLLER HEAD.
APPLICATION FILED AUG. 6, 1914.
1,142,202.
Patented June 8, 1915.
2 SHEETS—SHEET 2.
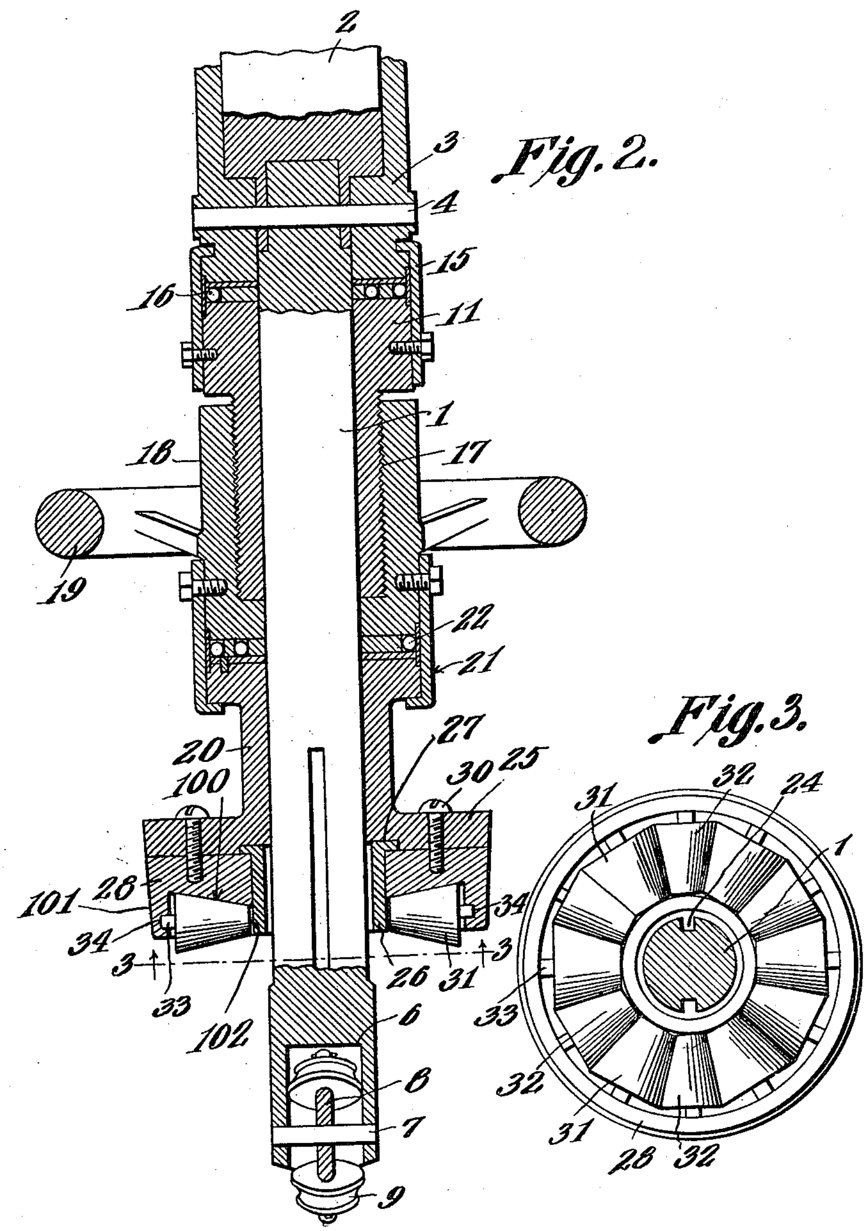
Witnesses
J. R. Tomlin
M. E. McCarthy
Frank X. Pfluger,
Inventor
by C. A. Snow & Co.
Attorneys
THE NORRIS PETERS CO., PHOTO-LITHO., WASHINGTON, D. C.

UNITED STATES PATENT OFFICE.

FRANK X. PFLUGER, OF PORTLAND, OREGON.

ROLLER-HEAD.

1,142,202. Specification of Letters Patent. Patented June 8, 1915.

Application filed August 6, 1914. Serial No. 855,517.

*To all whom it may concern:*

Be it known that I, FRANK X. PFLUGER, a citizen of the United States, residing at Portland, in the county of Multnomah and State of Oregon, have invented a new and useful Roller-Head, of which the following is a specification.

The device forming the subject matter of this application is a flanger, adapted to be employed for turning over flanges at the ends of bushings which are inserted into a bung-hole or spigot-hole of a cask.

One of the objects of the present invention is to improve the roller mechanism whereby a flange is turned over on the outer or upper end of the bushing.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 shows the invention in side elevation, parts being broken away; Fig. 2 is a longitudinal section; Fig. 3 is a cross section taken approximately on the line 3—3 of Fig. 2.

The device forming the subject matter of this application is an improvement upon the bushing flanger shown in my prior Patent No. 1,014,902, issued January 16, 1912. In view of the patent above mentioned, many of the parts of the device shown in this application are old and the description may be shortened accordingly, reference being had to the patent above referred to. Proper indication will be made in the description as to the point at which the description of novel elements peculiar to the structure herein disclosed begins.

The bushing flanger herein disclosed embodies a spindle 1 connected with an extension 2, one end of the spindle 1 and the corresponding end of the extension 2 being located within a sleeve 3, the spindle 1, the extension 2 and the sleeve 3 being held together for simultaneous rotation, through the medium of a pin 4. As indicated at 5 in Fig. 1, the spindle extension 2 is equipped with a keyway or the like, whereby the spindle 1 may be operatively connected with any prime mover for the purpose of imparting rotation to the spindle.

In the lower end of the spindle 1 there is formed a recess 6 across which extends a fulcrum pin 7 supporting intermediate its ends a shaft 8 on the extremities of which are journaled flanging rollers 9. These rollers 9 are employed for turning over the flange at the inner end of the bushing. The pivotally mounted shaft 8 is tilted on its fulcrum 7 through the medium of a draw rod 10 as in my prior patent above referred to.

Surrounding the spindle 1 adjacent the sleeve 3 is a combined bearing and abutment 11 provided as shown in Fig. 1 with a laterally extended, telescopic arm 12 pivoted to a support 14 of any desired sort. The sleeve is held upon the bearing 11 for rotation by means of fingers 15 and balls 16 are interposed between the bearing and the sleeve to take the thrust.

The bearing 11 is threaded as shown at 17 into a collar 18 having a hand wheel 19. Disposed below the collar 18 is a collar 20. The collars 18 and 20 are connected for rotation by means of fingers 21 and balls 22 are interposed between the last specified collars. As shown in Fig. 1, the collar 20 is provided with a short screw or like projection 23 mounted to move in an upright groove 24 formed in the spindle 1, the construction being such that the spindle and the collar 20 are connected for simultaneous rotation, it being possible, however, for the spindle and the collar to have relative longitudinal sliding movement.

All of the foregoing details are shown in my prior patent above mentioned, and the remainder of this specification is devoted to a specific description of those features which characterize patentably, the device forming the subject matter of this application.

The collar 20 is formed at its lower end with an outstanding flange 25 and to the flange 25 is attached by means of tap screws 30, a head or casing 28 of an annular form. Into the head or casing 28 is inserted a thimble 26 having an outstanding flange 27 which is bound between the flange 25 and the upper end of the head or casing 28. In the lower face of the head 28 is formed a recess defining a downwardly and inwardly slanting track 100 and a downwardly extended flange 101. As shown at 102, the lower end of the thimble 26 projects downwardly beyond the inner, lower edge of the track 100. In the inner face of the flange 101, a circumscribing groove 34 is formed, the groove 34 receiving terminal spindles 33 of rollers 31 and 32. The inner ends of the rollers 31 and 32 are devoid of spindles, the lower end 102 of the thimble 26 coacting with the inner ends of the rollers, to hold the rollers in place in the head 28. The rollers 31 and 32 of course are free to rotate upon their axes and in addition to the foregoing, the rollers have an orbital movement around the spindle 1, independently of the rotary movement of the head 28. The rollers 31 and 32 preferably of frusto-conical form are in contact. Noting Figs. 1 and 3 it will be observed that the rollers 31 are slightly larger in diameter than the rollers 32, one sixteenth of an inch difference in the diameters of the respective rollers being adequate for the ends in view. Now when the upper flange on the bushing is turned over, this work is accomplished by the rollers 31. The rollers 32 do not touch the flange on the bushing, but act as idlers for the rollers 31.

Reverting to my prior patent, it may be stated that it has been found impractical and unsatisfactory to carry out the particular roller construction therein disclosed, and as a specific improvement, the roller construction above described has been provided.

So far as the general operation of the structure heinbefore described is concerned, it will be understood that the lower end of the spindle 1 is inserted into the bung-hole or spigot-hole of the cask and then the shaft 8 is tilted into a horizontal position through the medium of the draw rod 10. Through the medium of the hand wheel 19, the rollers 31 are forced downwardly and the rollers 9 are drawn upwardly at predetermined intervals during the rotation of the spindle 1.

Having thus described the invention, what is claimed is:—

1. In a bushing flanger of the type described, a bearing; a spindle longitudinally movable therein; means for producing relative longitudinal movement between the spindle and the bearing; means for rotating the spindle and the bearing; a flanging element on the spindle; an annular casing carried by the bearing; and rollers mounted in the casing for axial rotation and for orbital movement about the spindle independently of the rotation of the casing, the rollers being adapted to contact peripherally with each other.

2. In a bushing flanger of the type described, a bearing; a spindle longitudinally movable therein; means for producing relative longitudinal movement between the spindle and the bearing; means for rotating the spindle and the bearing; a flanging element on the spindle; and an annular casing carried by the bearing; and rollers mounted in the casing for axial rotation and for orbital movement about the spindle independently of the rotation of the casing, the rollers being adapted to contact peripherally with each other, certain of the rollers in the casing being of greater diameter than other rollers in the casing.

In testimony that I claim the foregoing as my own, I have hereto affixed my signature in the presence of two witnesses.

FRANK X. PFLUGER.

Witnesses:
W. F. FURSTEL,
N. B. LAPPENS.

Copies of this patent may be obtained for five cents each, by addressing the "Commissioner of Patents, Washington, D. C."